(12) United States Patent
Inoue

(10) Patent No.: US 10,540,125 B2
(45) Date of Patent: Jan. 21, 2020

(54) PRINTING APPARATUS, CONTROL METHOD OF THE SAME, AND STORAGE MEDIUM

(71) Applicant: CANON KABUSHIKI KAISHA, Tokyo (JP)

(72) Inventor: Go Inoue, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/010,572

(22) Filed: Jun. 18, 2018

(65) Prior Publication Data
US 2018/0373475 A1 Dec. 27, 2018

(30) Foreign Application Priority Data
Jun. 27, 2017 (JP) .................. 2017-125590

(51) Int. Cl.
*G06F 3/12* (2006.01)
*H04W 76/14* (2018.01)
*H04W 88/10* (2009.01)

(52) U.S. Cl.
CPC .......... *G06F 3/1222* (2013.01); *G06F 3/1204* (2013.01); *G06F 3/1236* (2013.01); *G06F 3/1238* (2013.01); *G06F 3/1292* (2013.01); *H04W 76/14* (2018.02); *H04W 88/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,986,591 | B2* | 5/2018 | Yada | H04W 76/36 |
| 2003/0091015 | A1* | 5/2003 | Gassho | H04W 88/04 370/338 |
| 2014/0366101 | A1* | 12/2014 | Murata | H04N 1/00127 726/4 |
| 2017/0064723 | A1* | 3/2017 | Armstrong | H04W 4/021 |
| 2017/0094581 | A1* | 3/2017 | Sun | H04L 45/745 |
| 2018/0248697 | A1* | 8/2018 | Shinnada; Yusuke | H04L 9/321 |

FOREIGN PATENT DOCUMENTS

JP 2012186555 A 9/2012

* cited by examiner

*Primary Examiner* — Helen Zong
(74) *Attorney, Agent, or Firm* — Carter, DeLuca & Farrell LLP

(57) ABSTRACT

There is provided a technique of controlling, in a printing apparatus that has an access point function, the operation state of the access point function in accordance with the setting of connection information required for wireless direct connection to the printing apparatus. As the setting of the connection information required for the wireless direct connection, the printing apparatus executes a fixed SSID setting or a one-time SSID setting. If the fixed SSID setting is executed, the printing apparatus causes a wireless LAN I/F to start an access point operation in accordance with the activation of the printing apparatus. If the one-time SSID setting is executed, the printing apparatus causes the wireless LAN I/F to start the access point operation in accordance with a start instruction by a user.

15 Claims, 8 Drawing Sheets

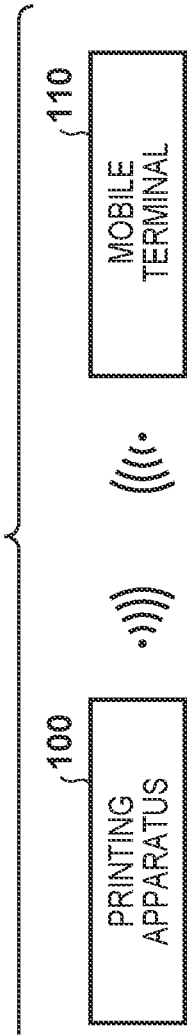
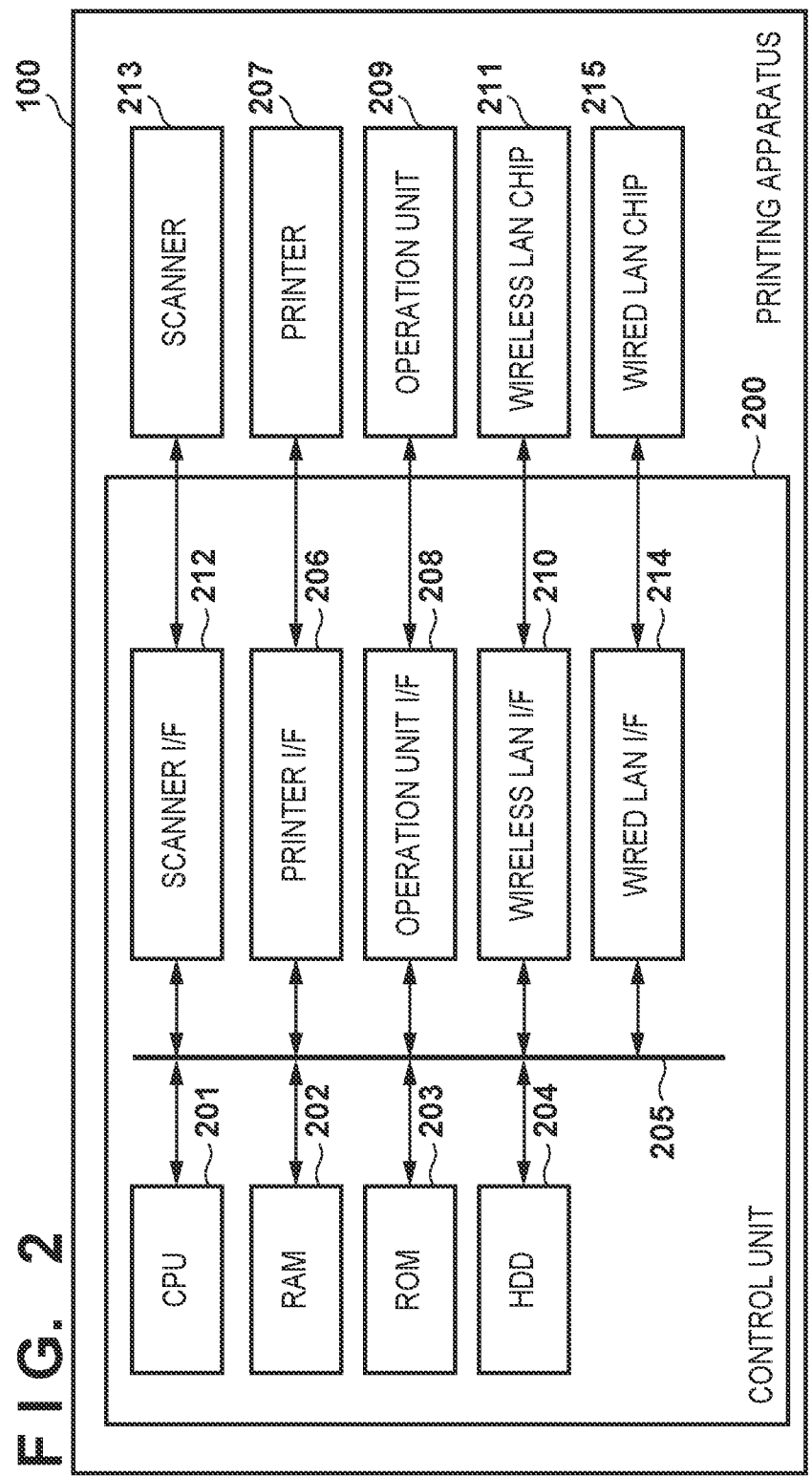

FIG. 3A

| WIRELESS DIRECT FUNCTION SETTING | USE | NOT USE |
|---|---|---|
| SSID/KEY TYPE SETTING | FIXED MODE | ONE-TIME MODE |

FIG. 3B

| WIRELESS DIRECT FUNCTION SETTING | USE | NOT USE |
|---|---|---|
| SSID/KEY TYPE SETTING | FIXED MODE | ONE-TIME MODE |
| CONSTANT ON SETTING FOR WIRELESS DIRECT FUNCTION | ENABLE | DISABLE |

FIG. 3C

| WIRELESS DIRECT FUNCTION SETTING | USE | NOT USE | |
|---|---|---|---|
| SSID/KEY TYPE SETTING | FIXED MODE | ONE-TIME MODE | INDIVIDUAL MODE |
| CONSTANT ON SETTING FOR WIRELESS DIRECT FUNCTION | ENABLE | DISABLE | |

FIG. 4A

WIRELESS DIRECT FUNCTION CAN BE STARTED

START

FIG. 4B

DIRECT CONNECTION IS POSSIBLE

SSID⋯Network_01
KEY⋯0123456789

STOP

PRINTING APPARATUS, CONTROL METHOD OF THE SAME, AND STORAGE MEDIUM

BACKGROUND OF THE INVENTION

Field of the Invention

The present invention relates to a printing apparatus, a control method of the same, and a storage medium.

Description of the Related Art

Printing apparatuses such as a multifunction peripheral, a printer, and the like increasingly have a wireless LAN function. A printing apparatus that has a wireless LAN function can receive, via an access point, print data from an external apparatus such as a PC or a mobile terminal and execute print processing based on the received print data. Recently, there is also known a printing apparatus that has a function of performing direct wireless communication with an external apparatus without intervention of a relay apparatus such as an access point. For example, Japanese Patent Laid-Open No. 2012-186555 discloses a printing apparatus that uses an access point function to perform direct wireless communication with a mobile terminal. An access point mode (software AP mode) and Wi-Fi Direct® are known as examples of such an access point function.

In general, in such a printing apparatus as described above, a user operates an operation panel of the printing apparatus to cause the printing apparatus to start an access point operation so that direct wireless communication can be performed between a mobile terminal and the printing apparatus. When the user has completed operating the printing apparatus by using the direct wireless communication from the mobile terminal, the user operates the operation panel of the printing apparatus to cause the printing apparatus to stop the access point operation. In this case, since the user is required to operate the operation panel of the printing apparatus to make instructions to start and to stop the access point operation each time direct wireless communication needs to be used, the operation can be troublesome for the user.

To solve the above problem, it is possible to cause the printing apparatus to constantly perform the access point operation (that is, to set the access point function to a constant ON state) like a general access point so that the printing apparatus can be operated with improved user convenience. On the other hand, in some cases, from the viewpoint of security, it may be set so that the connection information such as an SSID and the like necessary for connecting to the printing apparatus is changed each time an access point operation is started. In this case, since the connection information cannot be changed unless the access point operation is stopped, the security of the operation of the printing apparatus cannot be ensured.

SUMMARY OF THE INVENTION

The present invention has been made in consideration of the above problems. The present invention provides a technique of controlling, in a printing apparatus that has an access point function, an operation state of the access point function in accordance with the setting of connection information required for wireless direct connection to the printing apparatus.

According to one aspect of the present invention, there is provided a printing apparatus comprising: a wireless communication unit configured to perform an access point operation of causing the printing apparatus to operate as an access point for wireless direct connection with an external apparatus; a setting unit configured to perform, as setting of connection information required for the wireless direct connection, a first setting in which the connection information is not changed when the access point operation is to be started and a second setting in which the connection information is changed when the access point operation is to be started; and a control unit configured to control the wireless communication unit so as to start, if the first setting is performed by the setting unit, the access point operation in accordance with activation of the printing apparatus, and start, if the second setting is performed by the setting unit, the access point operation in accordance with a start instruction by a user.

According to another aspect of the present invention, there is provided a control method of a printing apparatus that includes a wireless communication unit configured to perform an access point operation of causing the printing apparatus to operate as an access point for wireless direct connection with an external apparatus, the method comprising: setting, as setting of connection information required for the wireless direct connection, one of a first setting in which the connection information is not changed when the access point operation is to be started and a second setting in which the connection information is changed when the access point operation is to be started; and controlling the wireless communication unit so as to start, if the first setting is performed in the setting, the access point operation in accordance with activation of the printing apparatus, and start, if the second setting is performed in the setting, the access point operation in accordance with a start instruction by a user.

According to still another aspect of the present invention, there is provided a non-transitory computer-readable storage medium storing a computer program for causing a computer to execute a control method of a printing apparatus that includes a wireless communication unit configured to perform an access point operation of causing the printing apparatus to operate as an access point for wireless direct connection with an external apparatus, the method comprising: setting, as setting of connection information required for the wireless direct connection, one of a first setting in which the connection information is not changed when the access point operation is to be started and a second setting in which the connection information is changed when the access point operation is to be started; and controlling the wireless communication unit so as to start, if the first setting is performed in the setting, the access point operation in accordance with activation of the printing apparatus, and start, if the second setting is performed in the setting, the access point operation in accordance with a start instruction by a user.

According to the present invention, it becomes possible to control, in a printing apparatus that has an access point function, an operation state of the access point function in accordance with the setting of connection information required for wireless direct connection to the printing apparatus Further features of the present invention will become apparent from the following description of exemplary embodiments (with reference to the attached drawings).

BRIEF DESCRIPTION OF THE DRAWINGS

FIG. 1 illustrates an example of the arrangement of a network.

FIG. 2 is a block diagram showing an example of the hardware arrangement of a printing apparatus.

FIGS. 3A to 3C illustrate examples of an operation screen for setting a wireless direct function.

FIGS. 4A and 4B illustrate examples of an operation screen for instructing the wireless direct function to start or stop.

DESCRIPTION OF THE EMBODIMENTS

Figure 5:
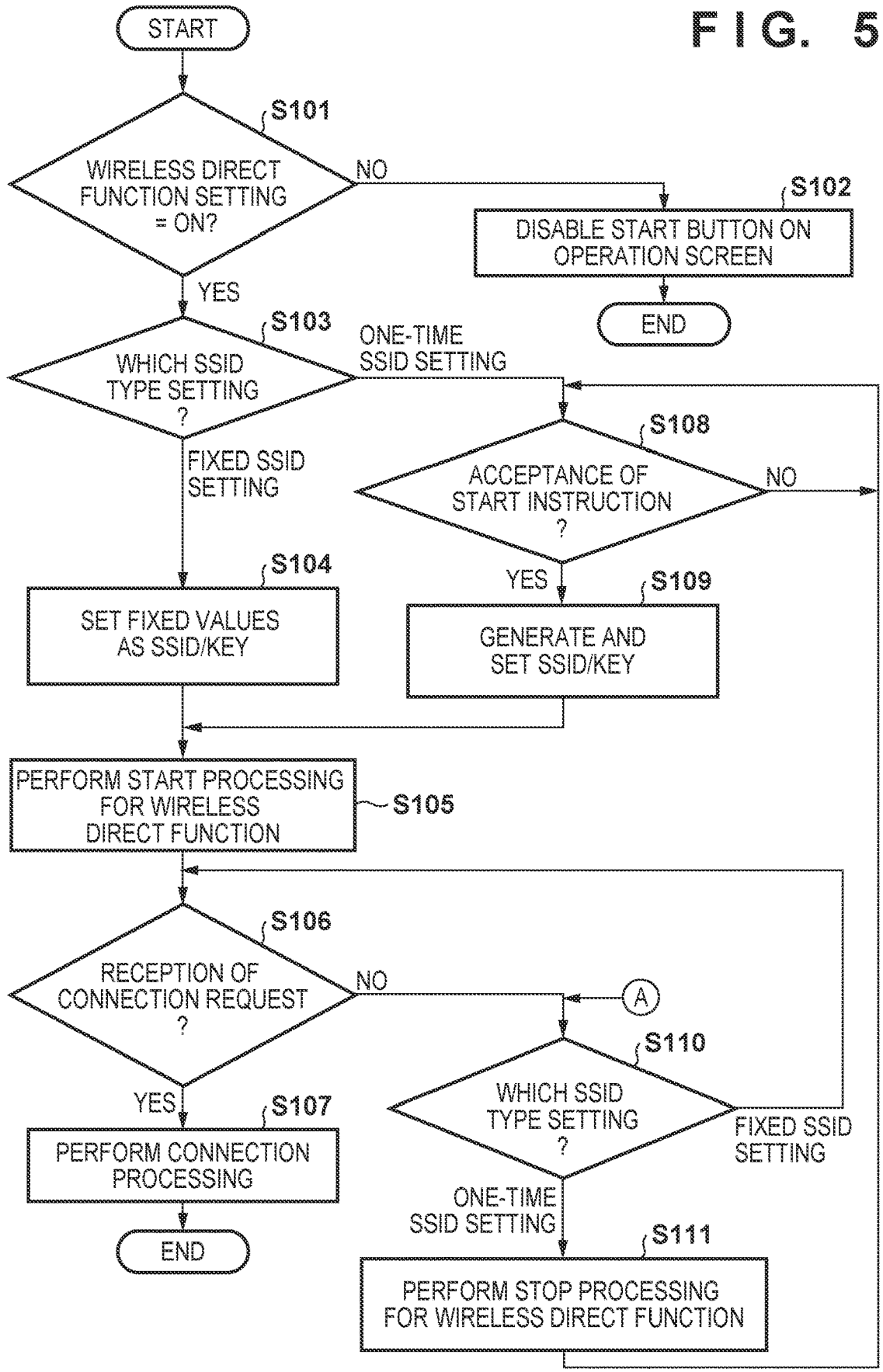
FIG. 5 is a flowchart showing a connection processing procedure (first embodiment).

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

A printing apparatus 100 that operates as an access point and controls the operation state of an access point function in accordance with the SSID type setting of the access point will be exemplified in the first embodiment.

<Network Arrangement>

FIG. 1 illustrates an example of a network arrangement assumed in this embodiment. The printing apparatus 100 has a communication function complying with a wireless LAN standard. The printing apparatus 100 can perform, with a mobile terminal 110 which has a communication function complying with a wireless LAN standard in the same manner, direct wireless communication without intervention of an access point. The printing apparatus 100 supports an access point mode in which the printing apparatus 100 operates as a master device (a wireless LAN access point) when it is to perform direct wireless communication with an external apparatus such as the mobile terminal 110.

<Arrangement of Printing Apparatus>

FIG. 2 is a block diagram showing an example of the hardware arrangement of the printing apparatus 100. The printing apparatus 100 includes: a control unit 200; and a printer 207, a scanner 213, an operation unit 209, a wireless LAN chip 211, and a wired LAN chip 215 that are connected to the control unit 200. The control unit 200 implements various types of functions such as a print function, a scan function, a copy function, a wired or wireless communication function, and the like of the printing apparatus 100 by controlling devices connected to the control unit 200. The control unit 200 includes, as devices connected to a system bus 205, a CPU 201, a RAM 202, a ROM 203, a hard disk drive (HDD) 204, a scanner interface (I/F) 212, a printer I/F 206, an operation unit I/F 208, a wireless LAN I/F 210, and a wired LAN I/F 214.

The CPU 201 controls the operation of the overall printing apparatus 100 by controlling the devices connected via the system bus 205. The RAM 202 is used as a temporary storage area such as a main memory, a work area, and the like of the CPU 201. The ROM 203 stores control programs of the printing apparatus 100. The CPU 201 reads out each control program stored in the ROM 203 to the RAM 202 and executes the program to execute various kinds of processing to control the operation of the printing apparatus 100. The HDD 204 stores various types of programs and various types of data such as print data, image data, and the like. Note that although this embodiment describes an example in which each processing operation (shown by a corresponding flowchart), which is to be described later, is executed by a single CPU 201, the present invention is not limited to this. For example, the printing apparatus 100 can be arranged so that a plurality of CPUs will cooperate and execute each processing operation.

The printer 207 executes print processing based on image data output from the control unit 200. The printing apparatus 100 can execute print processing by the printer 207 based on the print data received from an external apparatus such as the mobile terminal 110 or the image data generated by the scanner 213. The scanner 213 reads an image from an original to generate image data (read image data). The image data generated by the scanner 213 is used for print processing by the printer 207 or stored in the HDD 204. The operation unit 209, which includes a keyboard and a liquid crystal display that has a touch panel function, displays various types of screens. A user can input an instruction and information to the printing apparatus 100 via the operation unit 209.

The wireless LAN chip 211 is a communication chip for implementing wireless communication in compliance with a wireless LAN standard (wireless LAN communication). The wireless LAN I/F 210 implements wireless LAN communication with an external access point or an external apparatus such as the mobile terminal 110 by controlling the wireless LAN chip 211. The wireless LAN I/F 210 and the wireless LAN chip 211 are in compliance with a wireless LAN standard such as IEEE802.11a/b/g/n/ac. The wired LAN chip 215 is connected to a wired LAN and is a communication chip for implementing communication via the wired LAN. The wired LAN I/F 214 implements communication with an external apparatus such a PC terminal via the wired LAN by controlling the wired LAN chip 215.

The wireless LAN I/F 210 can operate in an infrastructure connection mode to connect to an external apparatus via an external access point (relay apparatus) and in a direct connection mode to perform wireless direct connection to an external apparatus without intervention of an access point. In the direct connection mode, the wireless LAN I/F 210 performs an access point operation to cause the printing apparatus 100 to operate as an access point for wireless direct connection with an external apparatus. In this embodiment, an access point operation by the wireless LAN I/F 210 is implemented by an access point mode (software AP mode). In place of the access point mode, the access point operation may be implemented by Wi-Fi Direct® which is defined by the Wi-Fi Alliance. Note that an access point function that implements such an access point operation will be called a "wireless direction function" hereinafter.

<Operation Screen of Printing Apparatus>

FIG. 3A illustrates an example (an operation screen 300) of an operation screen for setting of the wireless direct function according to this embodiment. On the operation screen 300, it is possible to set whether or not to use the wireless direct function (to turn on or off the setting of the wireless direct function) and to set an SSID (Service Set Identifier) type which is to be used. If the setting of the wireless direct function is turned off, the wireless direct function is disabled, and control is performed so that the wireless direct function cannot be used.

In this embodiment, as shown in FIG. 3A, a fixed mode (fixed SSID) or a one-time mode (one-time SSID) can be set as an SSID type setting. If the fixed SSID is set, the printing apparatus 100 uses, as the connection information required for wireless direct connection, an SSID and a KEY (a password, an encryption key, or a connection key) that have been set in advance. If the one-time SSID is set, the printing apparatus 100 uses, as the connection information necessary for wireless direct connection, an SSID and a KEY that are newly generated (different from those of a previous operation) each time the wireless direct function is to be started (when an access point operation is to be started).

The CPU 201 of the printing apparatus 100 sets the fixed SSID or the one-time SSID as the setting of the connection information (SSID and KEY) required for wireless direct connection in accordance with the setting contents of the operation screen 300. The HDD 204 stores various types of setting values such as a setting value that indicates setting contents of the operation screen 300 and the like. Note that in a case in which the ROM 203 includes an NVRAM (nonvolatile RAM) area, the various types of setting values may be stored in the NVRAM area of the ROM 203. In this embodiment, the fixed SSID setting is an example of a first setting in which the connection information is not changed when an access point operation is to be started. The one-time SSID setting is an example of a second setting in which the connection information is changed when an access point operation is to be started.

FIGS. 4A and 4B illustrate examples of an operation screen for making an instruction to start and to stop the wireless direct function. An operation screen 400 of FIG. 4A is, for example, a screen that is displayed on the operation unit 209 when a user selects the wireless direct function on a menu screen displayed on the operation unit 209. The user can instruct the start of the wireless direct function (the start of an access point operation) on the operation screen 400.

When a start instruction of an access point operation is made on the operation screen 400, the printing apparatus 100 causes the wireless LAN I/F 210 to start the access point operation and causes the operation unit 209 to display an operation screen 410 of FIG. 4B. When the access point operation is started (when the operation state of the wireless direct function is set to an ON state), the printing apparatus 100 changes to a state in which wireless direct connection from an external apparatus can be accepted. The operation screen 410 displays the connection information (SSID and KEY) necessary for the external apparatus such as the mobile terminal 110 to perform wireless direct connection to the printing apparatus 100. As a result, the user can make, on the mobile terminal 110, the operation necessary for wireless direct connection to the printing apparatus 100 by using the SSID and the KEY displayed on the operation screen 410.

The user can also make an instruction to stop the wireless direct function (stop the access point operation) on the operation screen 410. When a stop instruction of the access point operation is made on the operation screen 410, the printing apparatus 100 causes the wireless LAN I/F 210 to stop the access point operation. When the access point operation is stopped (when the wireless direct function is set to the OFF state), the printing apparatus 100 changes to a state in which wireless direct connection from the external apparatus is not accepted.

<Connection Processing>

FIG. 5 is a flowchart showing the procedure of connection processing for wireless direct connection which is to be executed by the CPU 201 in the printing apparatus 100. In this procedure, the CPU 201 executes wireless direct connection with the external apparatus (the mobile terminal 110 in this example) by causing the wireless LAN I/F 210 to operate in the access point mode in which the printing apparatus 100 operates as an access point. The processes of steps shown in FIG. 5 are implemented in the printing apparatus 100 by the CPU 201 reading out and executing a control program stored in the ROM 203.

After the printing apparatus 100 is powered-on, the CPU 201 refers to, in step S101, the setting values stored in the HDD 204 and determines whether or not the setting to use the wireless direct function has been made (whether or not the wireless direct function setting is set to the ON state). The wireless direct function setting is made by the user via the operation screen 300. If the setting to use the wireless direction is set, the CPU 201 advances the process to step S103, and otherwise, the CPU 201 advances the process to step S102.

In step S102, the CPU 201 disables (for example, grays out or stops the display of) the "start" button when the operation screen 400 is displayed on the operation unit 209. As a result, the user will not be able to make an instruction to start the wireless direct function, and control is performed so that the access point operation by the wireless LAN I/F 210 is not started. Subsequently, the CPU 201 ends the processing.

On the other hand, in step S103, the CPU 201 refers to the setting values stored in the HDD 204 and determines the SSID type setting. If the SSID type setting is the fixed SSID setting (first setting), the CPU 201 advances the process from step S103 to step S104. In step S104, the CPU 201 sets, as the SSID and the KEY (connection information) for the access point operation, fixed values which are preset and stored in the HDD 204.

Subsequently, in step S105, the CPU 201 executes the start processing of the wireless direct function to set the operation state of the wireless direct function to the ON state. More specifically, the CPU 201 causes the wireless LAN I/F 210 to start the operation of the access point mode. As a result, the printing apparatus 100 is set to a standby state in which the printing apparatus waits for a connection request from the mobile terminal 110. In this manner, in a case in which the SSID type setting is the fixed SSID setting, the CPU 201 controls the wireless LAN I/F 210 to start the access point operation in accordance with the activation of the printing apparatus 100.

If the SSID type setting is the one-time SSID setting (second setting), the CPU 201 advances the process from step S103 to step S108. In step S108, the CPU 201 waits for a start instruction from the user. When the user presses (touches) the start button on the operation screen 400 displayed on the operation unit 209, the CPU 201 determines that the start instruction has been accepted, and advances the process to step S109.

In step S109, the CPU 201 uses a random number to newly generate an SSID and a KEY (connection information) and sets the SSID and the KEY, which have been newly generated, as the SSID and the KEY for the access point operation. Subsequently, in step S105, the CPU 201 performs the start processing for the wireless direct function, as described above, to set the operation state of the wireless direct function to the ON state. As a result, the printing apparatus 100 changes to a standby state in which the printing apparatus waits for the connection request from the mobile terminal 110. In this manner, in a case in which the SSID type setting is the one-time SSID setting, the CPU 201 controls the wireless LAN I/F 210 to start the access point operation in accordance with the start instruction by the user.

Next, the CPU 201 advances the process from step S105 to step S106. In step S106, the CPU 201 determines whether or not a connection request for wireless direct connection has been received from the mobile terminal 110 while the access point operation is performed by the wireless LAN I/F 210. If the connection request has been received, the CPU 201 advances the process to step S107 and performs, based on the received connection request, connection processing to establish the wireless direct connection with the mobile terminal 110. In a case where the wireless direct connection is established between the printing apparatus 100 and the mobile terminal 110, the user can use the mobile terminal 110 to make an operation to cause the printing apparatus 100 to execute printing or scanning. Note that in the case where the wireless direct connection is established, the CPU 201 ends the processing by the procedure of FIG. 5 and starts the processing by the procedure of FIG. 6.

In step S106, if the CPU 201 has not received a connection request within a predetermined time from the start of the access point operation by the wireless LAN I/F 210, it advances the process to step S110. In step S110, if the SSID type setting is the fixed SSID setting, the CPU 201 returns the process to step S106. That is, even if a connection request has not been received within the predetermined time from the start of the access point operation, the CPU 201 causes the wireless LAN I/F 210 to continue the access point operation.

In this manner, in a case where the printing apparatus 100 is operated under the fixed SSID setting, a state in which the external apparatus (the mobile terminal 110) can connect to the printing apparatus 100 can be maintained without requiring the user to operate the operation screen 400 to make a start instruction. Hence, user convenience is improved.

On the other hand, in step S110, if the SSID setting is the one-time SSID setting, the CPU 201 advances the process to step S111. In step S111, the CPU 201 performs stop processing for the wireless direct function to set the wireless direct function to the OFF state. More specifically, the CPU 201 causes the wireless LAN I/F 210 to stop the access point operation. That is, under a condition in which a connection request has not been received within a predetermined time from the start of the access point operation, the CPU 201 causes the wireless LAN I/F 210 to stop the access point operation. As a result, the printing apparatus 100 is set to a state in which it will not accept a connection request from the mobile terminal 110. Subsequently, the CPU 201 returns the process to step S108, displays the operation screen 400 on the operation unit 209, and waits for the start instruction from the user.

In this manner, in a case where the printing apparatus 100 is operated under the one-time SSID setting, the ON state (connection request standby state) of the wireless direct function will not be continued limitlessly. If the wireless direct function is started again by the start instruction from the user, an SSID and a KEY different from those used in the previous operation will be generated and set (step S109). Hence, the security of the printing apparatus 100 can be ensured.

<Connection Processing>

Figure 6:
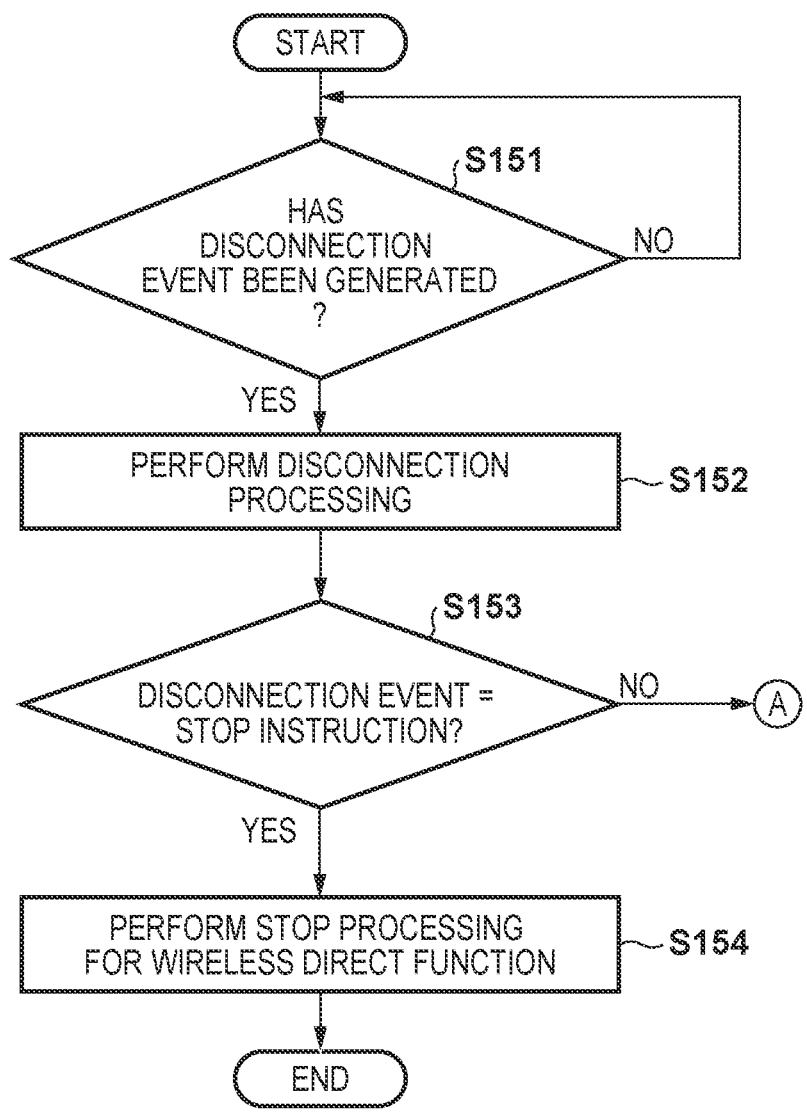
FIG. 6 is a flowchart showing a disconnection processing procedure (first and second embodiments).

FIG. 6 is a flowchart showing the procedure of the disconnection processing for disconnecting the wireless direct connection executed by the CPU 201 in the printing apparatus 100. The processes of steps shown in FIG. 6 are implemented in the printing apparatus 100 by the CPU 201 reading out and executing a control program stored in the ROM 203.

While establishing the wireless direct connection with the external apparatus (the mobile terminal 110 in this example), the CPU 201 determines, in step S151, whether or not a disconnection event for disconnecting the wireless direct connection has been generated. The disconnection event corresponds to, for example, a case in which a stop button has been touched on the operation screen 410, a case in which a disconnection request has been received from the mobile terminal 110, a case in which transmission/reception of radio waves by the wired LAN chip 215 has stopped, or a case in which the continuation time of the wireless direct connection has reached a maximum connection time that is preset in the printing apparatus 100. If any of these disconnection events occurs, the CPU 201 advances the process to step S152.

In step S152, the CPU 201 executes processing to disconnect the wireless direct connection with the mobile terminal 110. At this point, only the wireless direct connection with the mobile terminal 110 is disconnected, and the operation state of the wireless direct function is kept to the ON state. That is, the access point operation by the wireless LAN I/F 210 is continued.

Next, in step S153, the CPU 201 determines whether or not the disconnection event in step S151 corresponds to a stop instruction by the user which is made by using the stop button on the operation screen 410. If the disconnection event corresponds to the stop instruction, the CPU 201 advances the process to step S154. In step S154, the CPU 201 executes the stop processing for the wireless direct function to set the wireless direct function to the OFF state. More specifically, the CPU 201 causes the wireless LAN I/F 210 to stop the access point operation.

In this manner, in a case where the disconnection event corresponds to the stop instruction by the user, the access point operation performed by the wireless LAN I/F 210 is stopped regardless of the SSID type setting. This is because the user can make the stop instruction with the intention of stopping the access point operation (setting the operation state of the wireless direct function to the OFF state). In this case, the user is required to make a start instruction by using the operation screen 400 to start the access point operation again. When the stop processing for the wireless direct function has been completed, the CPU 201 ends the processing by the procedure of FIG. 6.

On the other hand, if the disconnection event does not correspond to the stop instruction by the user, the CPU 201 advances the process to step S110 (FIG. 5). As a result, in a case where the SSID type setting is the fixed SSID setting in step S110, the CPU 201 causes the wireless LAN I/F 210 to continue the access point operation (step S106). In this manner, in the case where the printing apparatus 100 is operated under the fixed SSID setting, a state in which the external apparatus (mobile terminal 110) can connect to the printing apparatus 100 can be maintained without requiring the user to operate the operation screen 400 to make a start instruction. Hence, user convenience is improved.

If the SSID type setting is the one-time SSID setting in step S110, the CPU 201 causes the wireless LAN I/F 210 stop the access point operation (step S111). As a result, until the user makes the start instruction via the operation screen 400, the printing apparatus 100 will stand by in a state in which the wireless LAN I/F 210 has stopped the access point operation. In this manner, in the case where the printing apparatus 100 is operated under the one-time SSID setting, the operation state of the wireless direct function always is set to the OFF state upon completion of one wireless direct connection operation. Furthermore, the next time the operation state of the wireless direct function is set to the ON state, an SSID and a KEY different from those used in the previous operation will be generated and set (step S109). Hence, the security of the printing apparatus 100 can be ensured.

As described above, in the printing apparatus 100 according to this embodiment, the wireless LAN I/F 210 performs an access point operation to cause the printing apparatus 100 to operate as an access point for wireless direct connection with the external apparatus. As the connection information (SSID and KEY) setting necessary for the wireless direct connection, the CPU 201 performs the fixed SSID setting (first setting) or the one-time SSID setting (second setting). If the fixed SSID setting is performed, the CPU 201 controls the wireless LAN I/F 210 so as to start the access point operation in accordance with the activation of the printing apparatus 100, and if the one-time SSID setting is performed, the CPU controls the wireless LAN I/F 210 so as to start the access point operation in accordance with the start instruction by the user.

According to this embodiment, in the printing apparatus 100 which has the access point function (wireless direct function), it becomes possible to control the operation state of the access point function in accordance with the setting of the connection information necessary for the wireless direct connection to the printing apparatus 100. More specifically, it becomes possible to control, in accordance with whether the SSID and the KEY are under a fixed setting or a one-time setting, the access point function so that it is set to the ON state by a user instruction or so that it is automatically set to the ON state. As a result, user convenience can be improved by reducing the user's labor of making an unnecessary operation while suitably ensuring security.

Second Embodiment

In the second embodiment, a printing apparatus 100 that operates as an access point and controls the operation state of an access point function based on an SSID type setting and a constant ON setting of the access point will be exemplified. Note that a description of parts in common with the first embodiment will be omitted hereinafter.

<Operation Screen of Printing Apparatus>

FIG. 3B illustrates an example (an operation screen 310) of an operation screen for setting of a wireless direct function according to this embodiment. On the operation screen 310, in addition to the setting contents in an operation screen 300, it is possible to set whether or not to make a constant ON setting for the wireless direct function. If "enable" is selected as the constant ON setting on the operation screen 310, a CPU 201 executes the constant ON setting for the wireless direct function. If "disable" is selected as the constant ON setting, the CPU 201 does not execute the constant ON setting for the wireless direct function. In this embodiment, the constant ON setting corresponds to a setting in which an access point operation by a wireless LAN I/F 210 is constantly set to an ON state.

In this embodiment, if the SSID type setting is the fixed SSID setting and the constant ON setting is executed, the CPU 201 controls the wireless LAN I/F 210 so as to start the access point operation in accordance with the activation of the printing apparatus 100. On the other hand, if the SSID type setting is the fixed SSID setting and the constant ON setting is not executed, the CPU 201 controls the wireless LAN I/F 210 so as to start the access point operation in accordance with a start instruction by a user. Note that if the SSID type setting is a one-time SSID, the CPU 201 controls the wireless LAN I/F 210 so as to start the access point operation in accordance with the start instruction by the user, in the same manner as that in the first embodiment.

<Connection Processing>

Figure 7:
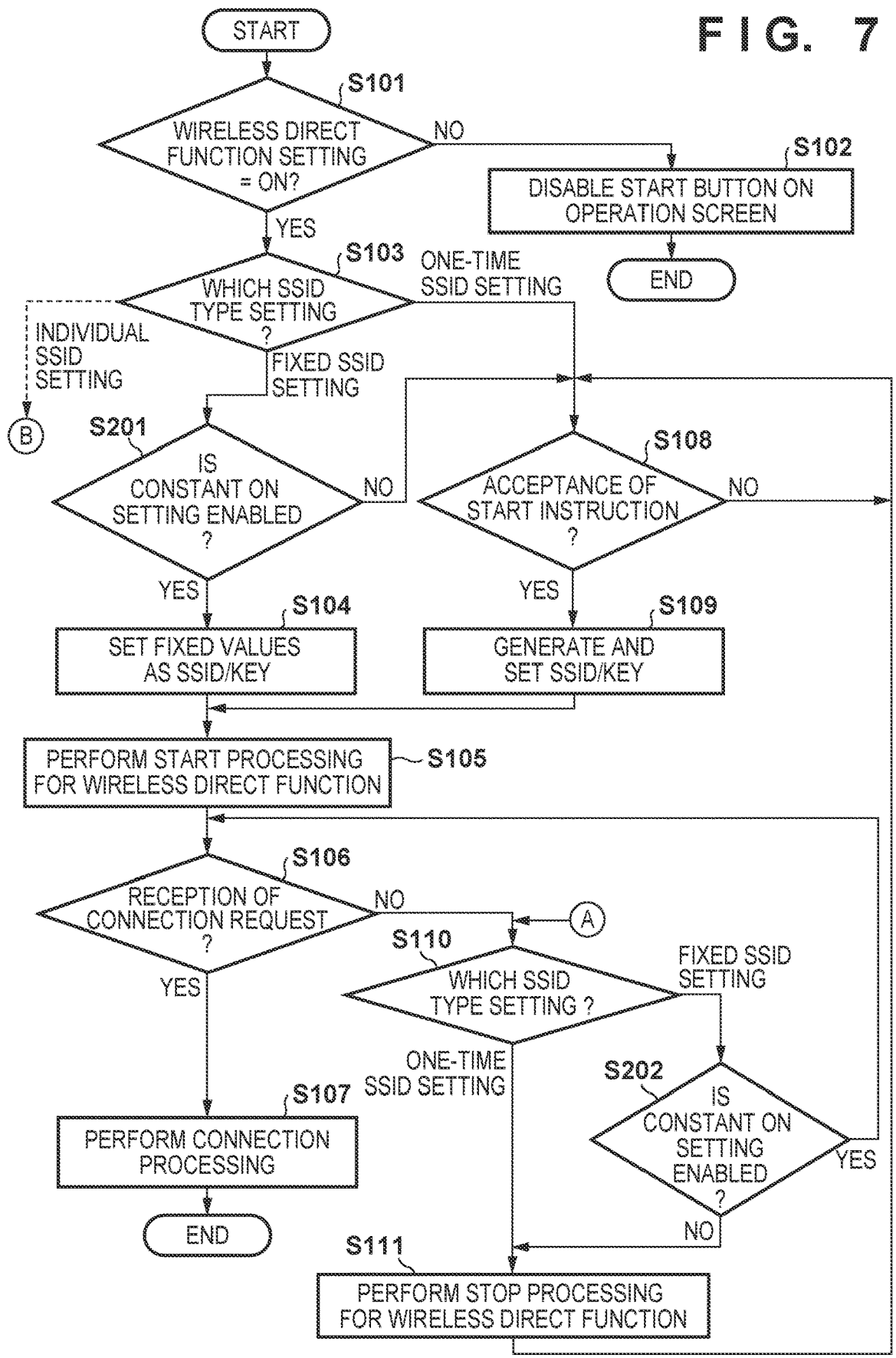
FIG. 7 is a flowchart showing a connection processing procedure (second and third embodiments).

FIG. 7 is a flowchart showing the procedure of the connection processing for wireless direct connection executed by the CPU 201 in the printing apparatus 100. The processes of steps shown in FIG. 7 are implemented in the printing apparatus 100 by the CPU 201 reading out and executing a control program stored in a ROM 203. Note that in FIG. 7, the same reference numerals denote steps that perform the same processes as those in the first embodiment (FIG. 5). Parts indicated by a dashed line are related to the third embodiment (to be described later) and will not be used in this embodiment.

In this embodiment, the processing for a case where the SSID type setting is the one-time SSID setting is the same as that in the first embodiment. In the processing of FIG. 7, the processing for a case where the SSID type setting is a fixed SSID differs from that in the first embodiment (FIG. 5). Hence, the processing for a case where the SSID type setting is the fixed SSID setting will be mainly described hereinafter.

The processes of steps S101 to S103 are the same as those in the first embodiment (FIG. 5). In this embodiment, in step S103, if the SSID type setting is the fixed SSID setting, the CPU 201 advances the process to step S201. In step S201, the CPU 201 refers to the setting values stored in an HDD 204 and determines whether or not the constant ON setting for the wireless direct function has been enabled. If the constant ON setting has been enabled, the CPU 201 advances the process to step S104. Otherwise, the CPU 201 advances the process to step S108. The processes of steps S104 to S107 are the same as those in the first embodiment (FIG. 5).

In this manner, in a case where the constant ON setting is disabled, even if the printing apparatus 100 is being operated under the fixed SSID setting, the start processing for the wireless direct function (step S105) is not executed until the start instruction by the user is accepted via an operation screen 400. On the other hand, in a case where the constant ON setting is enabled, the start processing for the wireless direct function (step S105) is executed in accordance with the activation of the printing apparatus 100 without acceptance of the start instruction by the user. Hence, even if the printing apparatus 100 is being operated under the fixed SSID setting, the user can select whether or not to start the access point operation in accordance with the start instruction by the user, and it is enabled to make settings suitable for the user.

Additionally, in this embodiment, if the CPU 201 has not received, in step S106, a connection request within a predetermined time from the start of the access point operation by the wireless LAN I/F 210, and if, in step S110, the SSID setting is the fixed SSID setting, the CPU advances the process to step S202. In step S202, if the constant ON setting is enabled, the CPU 201 returns the process to step S106 and causes the wireless LAN I/F 210 to continue the access point operation. In this manner, in a case where the constant ON setting is enabled, a state in which the external apparatus (mobile terminal 110) can connect to the printing apparatus 100 can be maintained without requiring the user to operate the operation screen 400 to make the start instruction. Hence, user convenience is improved.

On the other hand, if the constant ON setting is disabled, the CPU 201 advances the process to step S111 and causes the wireless LAN I/F 210 to stop the access point operation. In this manner, in a case where the constant ON setting is disabled, the ON state (connection request standby state) of the wireless direct function will not be continued limitlessly. Also, if the wireless direct function is started again by the start instruction from the user, an SSID and a KEY different from those used in the previous operation will be generated and set (step S109) in the same manner as that in a case where the one-time SSID setting is executed. Hence, it becomes possible to ensure the security of the printing apparatus 100.

<Disconnection Processing>

The procedure of the disconnection processing for disconnecting the wireless direct connection according to this embodiment is the same as that in the first embodiment (FIG. 6). However, in step S153, if the disconnection event does not correspond to the stop instruction by the user, the CPU 201 advances the process not to step S110 of FIG. 5 but to step S110 of FIG. 7.

More specifically, in a case where the disconnection event in step S151 correspond to the stop instruction by the user, the CPU 201 causes the wireless LAN I/F 210 to stop (step S154) the access point operation in the same manner as that in the first embodiment. In a case where the disconnection event does not correspond to the stop instruction by the user, if the SSID type setting is the fixed SSID setting and the constant ON setting has been enabled, the CPU 201 causes the wireless LAN I/F 210 to continue the access point operation (steps S110, S202, and S106). On the other hand, in a case where the disconnection event does not correspond to the stop instruction by the user, if the SSID type setting is the fixed SSID setting and the constant ON setting has been disabled, the CPU 201 causes the wireless LAN I/F 210 to stop the access point operation (steps S110, S202, and S111). Note that in a case where the disconnection event does not correspond to the stop instruction by the user and the SSID type setting is the one-time SSID setting, the CPU 201 will cause the wireless LAN I/F 210 to stop the access point operation (steps S110 and S111) in the same manner as that in the first embodiment.

According to this embodiment, even if the printing apparatus 100 is operated under the fixed SSID setting, the user is enabled, based on the constant ON setting, to select whether or not to start the access point operation in accordance with the start instruction by the user. Hence, the printing apparatus 100 can be operated to be more suitable for the needs of the user.

Note that since the processing for a case where the SSID type setting is the one-time SSID setting is the same as that in the first embodiment, it may be set so that the constant ON setting for the wireless direct function will be able to be performed only in a case where the SSID type setting has been set to the fixed SSID setting on the operation screen 310. Alternatively, if the constant ON setting has been enabled on the operation screen 310, it may be controlled so that the SSID type setting will be automatically set to the fixed SSID setting.

Third Embodiment

In the third embodiment, a printing apparatus 100 that operates as an access point and controls the operation state of an access point function based on an SSID type setting and a constant ON setting of the access point in a case where an individual SSID can be set as the SSID type setting will be exemplified in the third embodiment. Note that a description of parts in common with the first embodiment and the second embodiment will be omitted hereinafter.

<Operation Screen of Printing Apparatus>

FIG. 3C illustrates an example (an operation screen 320) of an operation screen for setting of a wireless direct function according to this embodiment. On the operation screen 320, in addition to the setting contents in an operation screen 310 according to the second embodiment, it is possible to set, as the SSID type setting, a fixed mode (fixed SSID), a one-time mode (one-time SSID), or an individual mode (individual SSID). The settings of the fixed SSID and the one-time SSID are the same as those in the first and second embodiments. In a case where the individual SSID setting is made, when the wireless direct function is to be started (when the access point operation is to be started), a printing apparatus 100 uses an SSID and a KEY which are different for each user as the connection information necessary for wireless direct connection. The individual SSID setting is an example of a third setting in which different connection information is used for each user when the access point operation is to be started.

In this embodiment, if the user logs in to the printing apparatus 100 for the first time by using an IC card or the like, the printing apparatus 100 automatically generates an SSID and a KEY unique to the logged-in user and stores the generated SSID and KEY in an HDD 204. For example, if a user A has logged in, "AAA001" and "12345" are generated automatically as the SSID and the KEY (password), respectively. Also, if a user B has logged in, "BBB001" and "54321" are generated automatically as the SSID and the KEY (password), respectively. In this manner, in a case where the SSID type setting is the individual SSID setting, an SSID and a KEY that are different for each user (unique to each user) are used as the connection information necessary for the wireless direct connection.

For second and subsequent login operations made by the same user to the printing apparatus 100, the printing apparatus 100 uses the SSID and the KEY corresponding to the user that are already stored in the HDD 204. In this manner, since the SSID and the KEY used at the time of the previous login operation are used without any changes for the second and subsequent login operations, the user operation to connect a mobile terminal 110 to the printing apparatus 100 by the wireless direct connection can be simplified.

<Connection Processing>

Figure 8:
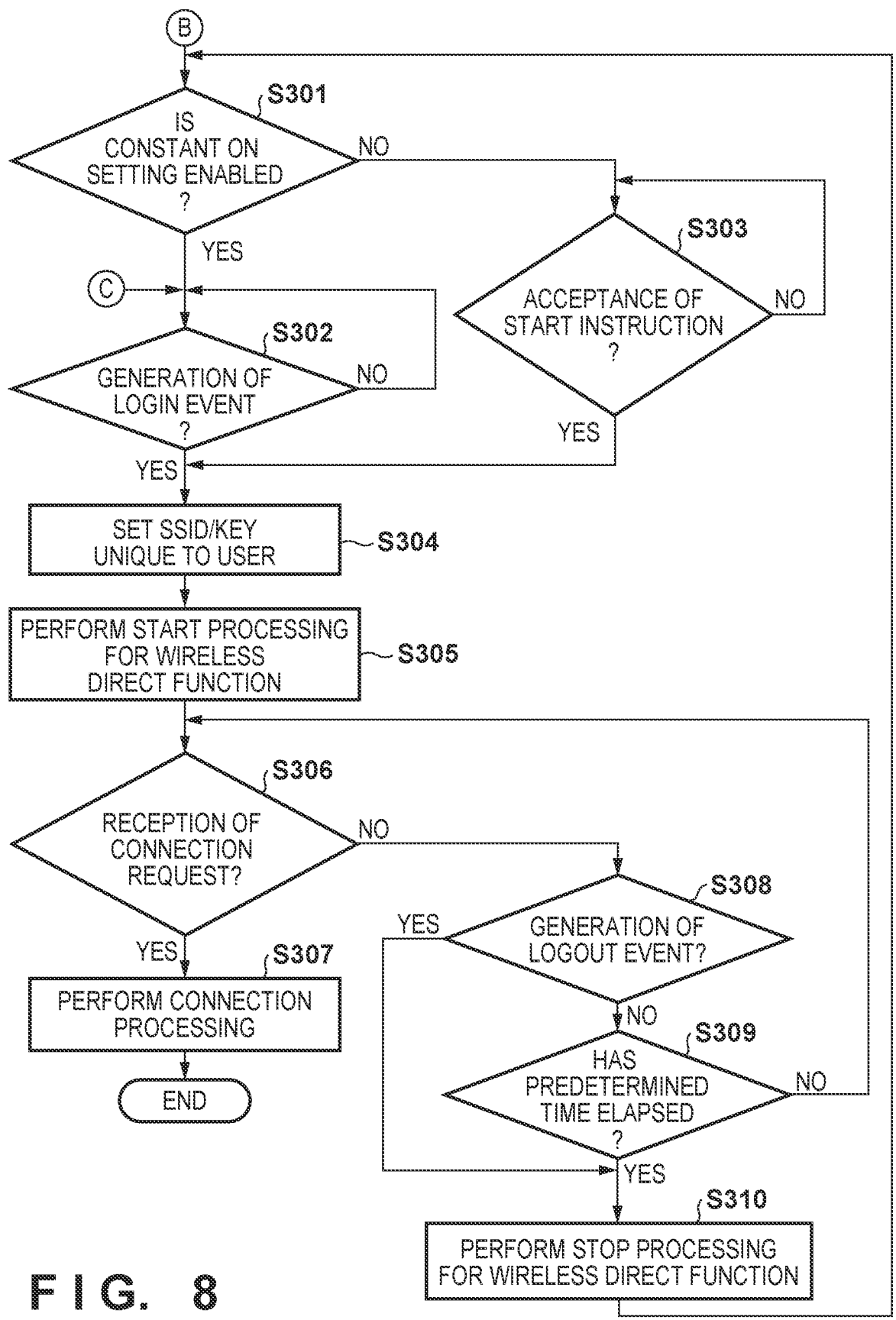
FIG. 8 is a flowchart showing a connection processing procedure (third embodiment).

The procedure of the connection processing for wireless direct connection executed by a CPU 201 in the printing apparatus 100 will be described with reference to FIGS. 7 and 8. The processes of steps shown in FIGS. 7 and 8 are implemented in the printing apparatus 100 by the CPU 201 reading out and executing a control program stored in a ROM 203.

In this embodiment, the processing for a case where the SSID type setting is the fixed SSID setting and that for a case where the SSID type setting is the one-time SSID setting are the same as those in the second embodiment, and the processing for a case where the SSID type setting is the individual SSID setting has been added. Hence, the processing for a case where the SSID type setting is the individual SSID setting will be mainly described hereinafter.

The processes of steps S101 and S102 of FIG. 7 are the same as those in the first embodiment (FIG. 5). In the third embodiment, in step S103, if the SSID type setting is the individual SSID setting, the CPU 201 advances the process to step S301 (FIG. 8). In step S301, the CPU 201 refers to the setting values stored in the HDD 204 and determines whether or not the constant ON setting for the wireless direct function has been enabled. If the constant ON setting has been enabled, the CPU 201 advances the process to step S302. Otherwise, the process is advanced to step S303.

In step S303, upon accepting the start instruction by the user via an operation screen 400 displayed on an operation unit 209, the CPU 201 advances the process to step S304. On the other hand, in step S302, the CPU 201 determines whether or not a login event has been generated (whether or not a user has logged in), and advances the process to step S304 if the login event has been generated.

In step S304, the CPU 201 obtains the SSID and the KEY unique to the logged-in user from the HDD 204 and sets the obtained SSID and KEY as the SSID and the KEY (connection information) for the access point operation. Note that in a case where the user has logged in to the printing apparatus 100 for the first time, the CPU 201 newly generates an SSID and a KEY which are unique to the user. Furthermore, the CPU 201 will set the generated SSID and KEY as the SSID and the KEY for the access point operation and store the generated SSID and KEY in the HDD 204. Note that in place of storing the generated SSID and KEY in the HDD 204, it may be set so that processing to generate the same SSID and KEY from the user information by using the same algorithm is performed each time the user logs in.

Subsequently, in step S305, the CPU 201 performs, in the same manner as in step S105, the start processing for the wireless direct function to set the operation state of the wireless direct function to an ON state. In this manner, in a case where the SSID type setting is the individual SSID setting and the constant ON setting for the wireless direct function has been enabled, the wireless direct function is automatically set to the ON state (the access point operation is started) when the user logs in to the printing apparatus 100. That is, if the SSID type setting is the individual SSID setting, the CPU 201 controls a wireless LAN I/F 210 so as to start the access point operation in accordance with a user's login to the printing apparatus 100.

Figure 9:
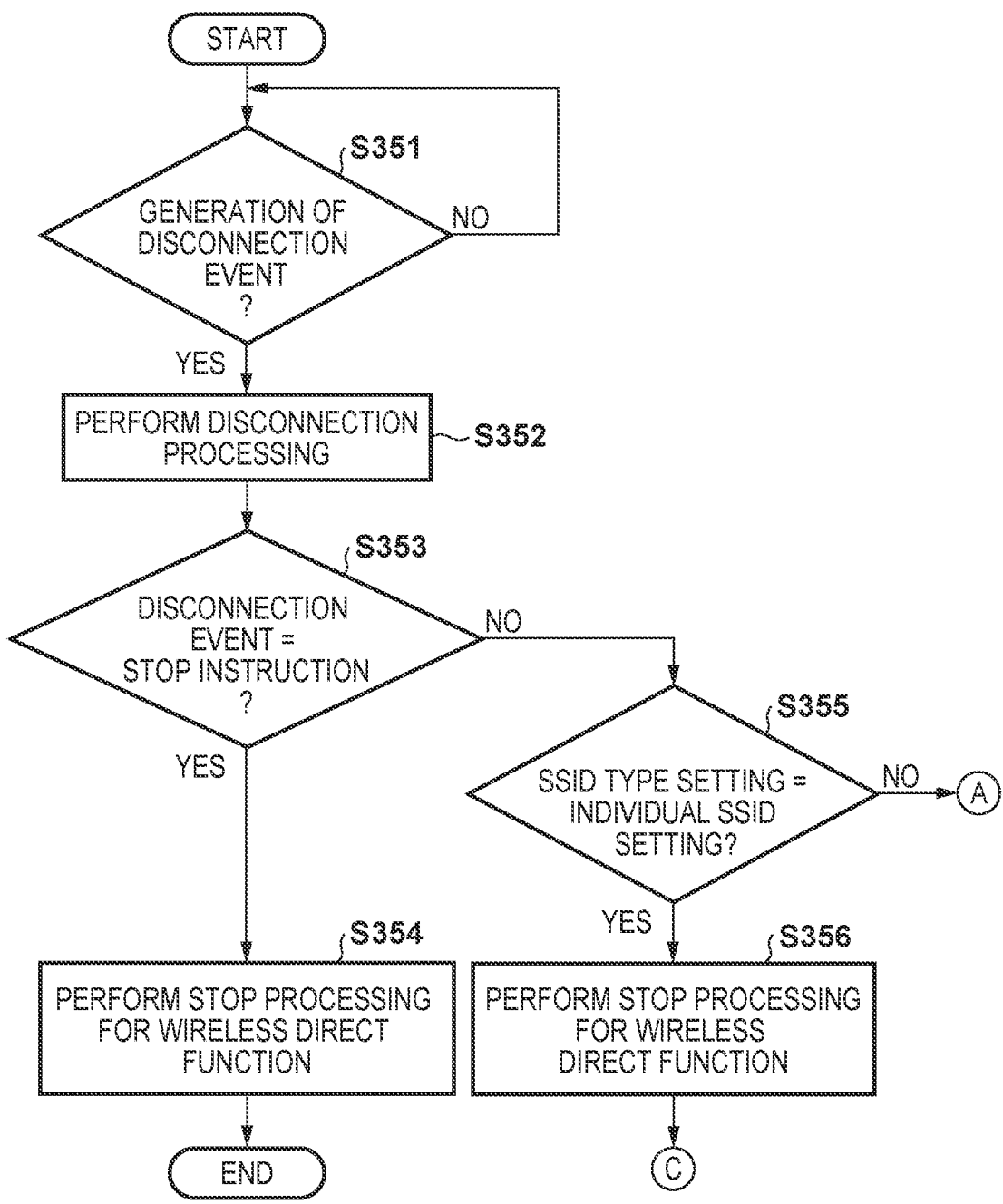
FIG. 9 is a flowchart showing a disconnection processing procedure (third embodiment).

Next, in step S306, the CPU 201 determines, while the wireless LAN I/F 210 performs the access point operation, whether or not a connection request for wireless direct connection has been received from the mobile terminal 110. If the CPU 201 has received the connection request, the CPU 201 advances the process to step S107 and performs connection processing to establish wireless direct connection with the mobile terminal 110 based on the received connection request. Subsequently, the processing according to the procedure of FIG. 8 ends, and the processing according to the procedure of FIG. 9 is started.

In a case where a logout event has been generated (the user has logged out from the printing apparatus 100) ("YES" in step S308) or in a case where a connection request has not been received within a predetermined time from the start of the access point operation ("YES" in step S309), the CPU 201 advances the process to step S310. Otherwise ("NO" in step S309), the CPU 201 returns the process to step S306 and continues to wait to receive a connection request from the mobile terminal 110. In step S310, the CPU 201 performs, in the same manner as step S111, the stop processing for the wireless direct function to set the wireless direct function to an OFF state. In this manner, if the user logs out from the printing apparatus 100 before the reception of a connection request from an external apparatus, the CPU 201 causes the wireless LAN I/F 210 to stop the access point operation. Subsequently, the CPU 201 returns the process to step S301.

<Disconnection Processing>

The procedure of the disconnection processing for disconnecting the wireless direct connection executed by the CPU 201 in the printing apparatus 100 will be described next with reference to FIG. 9. The processes of the steps shown in FIG. 9 are implemented in the printing apparatus 100 by the CPU 201 reading out and executing a control program stored in the ROM 203. Note that, as described above, the processing for a case where the SSID type setting is the one-time SSID setting and that for a case where the SSID type setting is the fixed SSID setting are the same as those in the second embodiment.

The processes of steps S351 to S354 are the same as those of steps S151 to S154 (FIG. 6). However, in step S354, when a disconnection event in step S351 does not correspond to a stop instruction from the user, the CPU 201 advances the process to step S355.

In step S355, if the SSID type setting is the individual SSID setting, the CPU 201 advances the process to step S356 and performs the stop processing for the wireless direct function. Subsequently, the CPU 201 advances the process to step S302 (FIG. 8) and waits until a login event is generated. On the other hand, in step S355, if the SSID type setting is not the individual SSID setting (is the fixed SSID setting or the one-time SSID setting), the CPU 201 advances the process to step S110 (FIG. 7) and performs the same processes as those in the second embodiment.

According to this embodiment, in a case where the printing apparatus 100 is operated under the individual SSID setting, the access point function can be set to the ON state in accordance with the login operation of the user. Also, even in a case where the printing apparatus 100 is operated under the individual SSID setting, it becomes possible to control, based on the constant ON setting, whether to set the access point function to the ON state by user instruction or to automatically set the access point function to the ON state in accordance with the login operation of the user. Hence, the printing apparatus 100 can be operated to be suitable for the needs of the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-125590, filed Jun. 27, 2017, which is hereby incorporated by reference herein in its entirety.

What is claimed is:

1. An image processing apparatus comprising:
   a processor; and
   a memory storing instructions which, when executed by the processor, cause the image processing apparatus to:
      perform an access point operation of causing the image processing apparatus to operate as an access point for wireless direct connection with an external apparatus;
      set, as setting of connection information required for the wireless direct connection, a first setting to activate an access point using predetermined connection information when the access point operation is to be started, or a second setting to activate, when the access point operation is to be started, the access point using connection information which is at least different from a previous one; and
      control to start, if the first setting is set, the access point operation in a starting operation of shifting the image processing apparatus from a power OFF state to a normal power state, without accepting a start instruction by a user to activate the access point, and start, if the second setting is set, the access point operation in accordance with accepting the start instruction by a user,
   wherein in both of a case where the first setting is set and a case where the second setting is set, the image processing apparatus is operable to receive information, from an external apparatus which has connected to the access point provided by the image processing apparatus, by wireless communication via the access point, and execute printing processing or scanning and data transmission processing based on the received information.

2. The image processing apparatus according to claim 1, wherein in the controlling, the instructions, when executed by the processor, cause the image processing apparatus to:
   in a case where the first setting is set, upon activation of the image processing apparatus, set the predetermined connection information for the access point operation and start the access point operation, and
   in a case where the second setting is set, upon receiving the start instruction from the user, newly generate the connection information, set the generated connection information for the access point operation, and start the access point operation.

3. The image processing apparatus according to claim 1, wherein the instructions, when executed by the processor, further cause the image processing apparatus to:
   establish, in a case where a connection request is received from the external apparatus based on the connection information while performing the access point operation, wireless direct connection with the external apparatus, and
   cause, in a case where a disconnection event for disconnecting the wireless direct connection is generated, disconnect of the wireless direct connection.

4. The image processing apparatus according to claim 3, wherein the instructions, when executed by the processor, further cause the image processing apparatus to:
   in a case where the disconnection event is a stop instruction by the user, stop the access point operation, and
   in a case where the disconnection event is not the stop instruction by the user, continue the access point operation if the first setting is set, and stop the access point operation if the second setting is set.

5. The image processing apparatus according to claim 1, wherein the instructions, when executed by the processor, further cause the image processing apparatus to:
   in a case where the first setting is set, continue the access point operation even if a connection request has not been received within a predetermined time from the start of the access point operation, and
   in a case where the second setting is set, stop the access point operation under a condition in which the connection request has not been received within the predetermined time from the start of the access point operation.

6. The image processing apparatus according to claim 1, wherein the instructions, when executed by the processor, further cause the image processing apparatus to:
   in a case where the first setting is set and a setting to constantly set the access point operation to an ON state is set, start the access point operation in accordance with the activation of the image processing apparatus, and
   in a case where the first setting is set and the setting to constantly set the access point operation to the ON state is not set, start the access point operation in accordance with the start instruction by the user.

7. The image processing apparatus according to claim 1, wherein the instructions, when executed by the processor, further cause the image processing apparatus to:
   in a case where the first setting is set and a setting to constantly set the access point operation to an ON state is set, continue the access point operation even if a connection request has not been received within a predetermined time from the start of the access point operation, and
   in a case where the first setting is set and the setting to constantly set the access point operation to the ON state is not set, stop the access point operation under a condition in which the connection request has not been received within the predetermined time from the start of the access point operation.

8. The image processing apparatus according to claim 3, wherein the instructions, when executed by the processor, further cause the image processing apparatus to:
   in a case where the disconnection event is a stop instruction by the user, stop the access point operation, and
   in a case where the disconnection event is not the stop instruction by the user:
      continue the access point operation if the first setting is set and a setting to constantly set the access point operation to an ON state is set, and
      stop the access point operation if the first setting is set and the setting to constantly set the access point operation to the ON state is not set, or if the second setting is set.

9. The image processing apparatus according to claim 1, wherein the instructions, when executed by the processor, further cause the image processing apparatus to:

perform, as the setting of the connection information required for the wireless direct connection, one of the first setting, the second setting, and a third setting in which different connection information is used for each user when the access point operation is to be started, and control, if the third setting is set, to start the access point operation in accordance with a user's login to the image processing apparatus.

10. The image processing apparatus according to claim 9, wherein the instructions, when executed by the processor, further cause the image processing apparatus to, in a case where the third setting is set, stop the access point operation when the user logs out from the image processing apparatus before a connection request is received from the external apparatus.

11. The image processing apparatus according to claim 9, wherein the instructions, when executed by the processor, further cause the image processing apparatus to:

in a case where a disconnection event for disconnecting the wireless direct connection established with the external apparatus is generated:
stop the access point operation if the disconnection event is a stop instruction by the user, and
stop the access point operation if the disconnection event is not the stop instruction by the user and the third setting is set.

12. The image processing apparatus according to claim 1, wherein the connection information comprises an SSID and a password.

13. The image processing apparatus according to claim 1, wherein the access point operation is set by one of an access point mode or Wi-Fi Direct.

14. A control method of an image processing apparatus configured to perform an access point operation of causing the image processing apparatus to operate as an access point for wireless direct connection with an external apparatus, the method comprising:

setting, as setting of connection information required for the wireless direct connection, one of a first setting to activate an access point using predetermined connection information when the access point operation is to be started, or a second setting to activate, when the access point operation is to be started, the access point using connection information which is at least different from a previous one; and controlling to start, if the first setting is set in the setting, the access point operation in a starting operation of shifting the image processing apparatus from a power OFF state to a normal power state, without accepting a start instruction by a user to activate the access point, and start, if the second setting is set in the setting, the access point operation in accordance with accepting the start instruction by a user, wherein in both of a case where the first setting is set and a case where the second setting is set, the image processing apparatus is operable to receive information, from an external apparatus which has connected to the access point provided by the image processing apparatus, by wireless communication via the access point, and execute printing processing or scanning and data transmission processing based on the received information.

15. A non-transitory computer-readable storage medium storing a computer program for causing a computer to execute a control method of an image processing apparatus configured to perform an access point operation of causing the image processing apparatus to operate as an access point for wireless direct connection with an external apparatus, the method comprising:

setting, as setting of connection information required for the wireless direct connection, one of a first setting to activate an access point using predetermined connection information when the access point operation is to be started, or a second setting to activate, when the access point operation is to be started, the access point using connection information which is at least different from a previous one; and controlling to start, if the first setting is set in the setting, the access point operation in a starting operation of shifting the image processing apparatus from a power OFF state to a normal power state, without accepting a start instruction by a user to activate the access point, and start, if the second setting is set in the setting, the access point operation in accordance with accepting the start instruction by a user, wherein in both of a case where the first setting is set and a case where the second setting is set, the image processing apparatus is operable to receive information, from an external apparatus which has connected to the access point provided by the image processing apparatus, by wireless communication via the access point, and execute printing processing or scanning and data transmission processing based on the received information.

* * * * *